(12) United States Patent
Friedman (10) Patent No.: US 7,390,123 B2
(45) Date of Patent: Jun. 24, 2008

(54) VARIABLE EMITTANCE SURFACES

(75) Inventor: Melvin H. Friedman, Alexandria, VA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 455 days.

(21) Appl. No.: 11/203,584

(22) Filed: Aug. 9, 2005

(65) Prior Publication Data

US 2007/0036200 A1    Feb. 15, 2007

(51) Int. Cl.
*G01N 25/00* (2006.01)
(52) U.S. Cl. .......................................... 374/9; 428/919
(58) Field of Classification Search .................. 374/9; 428/919
See application file for complete search history.

(56) References Cited

U.S. PATENT DOCUMENTS

| | | | | |
|---|---|---|---|---|
| 3,768,754 A | * | 10/1973 | Janes ........................ 244/171.8 |
| 5,734,495 A | * | 3/1998 | Friedman ...................... 359/350 |
| 6,538,796 B1 | * | 3/2003 | Swanson ....................... 359/291 |
| 6,619,180 B1 | * | 9/2003 | Hoover et al. ................. 89/36.02 |
| 6,713,774 B2 | * | 3/2004 | DeSteese et al. ............ 250/505.1 |

* cited by examiner

*Primary Examiner*—Gail Verbitsky
*Assistant Examiner*—Mirellys Jagan
(74) *Attorney, Agent, or Firm*—Andrew Romero; John Raubitschek (57) ABSTRACT

Designs for constructing a surface with variable emittance are described. This is achieved by making a surface where the emissivity varies on a scale smaller than the resolution of a thermal imager viewing the surface. One design utilizes many cylindrical surfaces with their axis parallel and their surfaces nearly in contact. Individual cylinders have the property that when rotated to zero degrees they show a surface with an emissivity of one and when rotated to 180 degrees display a surface with an emissivity of zero. At intermediate angles of rotation a sensor that could resolve individual cylinders would see alternate lines with high and low emittance but a sensor unable to resolve individual cylinders sees a surface with an emittance that depends on the angle the cylinders are rotated. Variable emittance surfaces are expected to be useful for controlling target signature and for making spectral reflectivity measurements using a hyper-spectral radiometer.

2 Claims, 7 Drawing Sheets

VARIABLE EMITTANCE SURFACES

GOVERNMENT INTEREST

The invention described herein may be manufactured, used, sold, imported, and/or licensed by or for the Government of the United States of America.

FIELD OF INTEREST

The invention relates to the remote detection of various objects via the object's emittance and more particularly, to varying the object's emittance to identify or camouflage them.

BACKGROUND OF THE INVENTION

Countermeasures to both visible and thermal sensors, such as camouflage and target signature reduction, have been of great importance in the modern battlefield. One typical infrared (IR) camouflage technique involves covering an object with a material cover, with or without environmentally controlled subsystems (having added extraordinary power requirements). Much effort has been expended in the determination of the materials to be used to comprise the typical IR camouflage covering. One example in the IR camouflage prior art may be found in U.S. Pat. No. 4,156,033 to Earl F. Bienz issued on 22 May 1979. In the Bienz patent there is disclosed applying appropriate foam layers to a tank, so as to mask its thermal signature. In the visible and also in the infrared, these approaches have had limited success.

In the infrared, some factors for the aforementioned limited success includes the following:

a. camouflage material has different heat transfer characteristics from the background resulting in changing apparent temperature differences between the target and the background over a diurnal cycle, b. camouflage net material is vented to prevent heat build up but winds cause the material to move which effects a blinking IR beacon, c. one observer seeing an object against a hot background (such as the ground) and a second observer seeing the same object against a cold background (such as the sky), allows for a situation where the current state of the art does not permit the object to simultaneously be made to appear hotter to the first observer and colder to the second observer, and d. when either the surface and/or the observer moves, the apparent temperature and spatial pattern of the background against which the surface is seen appears to change, thus clearly showing a target.

In the visible, limited success has also resulted from factors including the following:

a. camouflage patterns painted on a conventional surface are unable to change and a fixed camouflage pattern is inappropriate for the variety of backgrounds encountered in nature, b. one observer sees a military target against a rocky background while another observer sees the target against a forested background while a third observer sees the target against a red barn. The current state of the art does not allow the military target to be effectively camouflaged for all these observers in real time, and c. when either the military target or the observer move, the background against which the target is seen changes reducing the effectiveness of the camouflage pattern.

Modeling camouflage effectiveness is an area undergoing rapid development, where current modeling methodologies consider both the infrared and visible spectrum. Finding targets in the infrared requires target size and apparent temperature difference between the target and the background, a summary measure that combines target background physical temperature difference and target-background emissivity difference. As current IR sensor technology (of which the sensors are commonly called forward-looking infrared (FLIR) sensors) matures, sensors which respond to apparent temperature difference will be replaced by multi-band radiometers and hyper-spectral line scanners capable of generating contrasts which can separate these two effects; i.e. they can generate a contrast based on the physical temperature differences between the target and the background and a separate contrast based on emissivity differences between the target and the background. Making targets hard to find in the visible is primarily concerned with the development of ever more effective camouflage patterns and with techniques for characterizing the effectiveness of the camouflage for particular terrain.

While the prior art has reported using surface modification devices and techniques, none have established a basis for a specific apparatus and technique dedicated to the task of resolving the particular problem at hand. What is needed in this instance is a real-time control of: 1) the effective emissivity (band averaged or spectral) in the thermal wavelength region, 2) apparent color in the visible wavelength region, and 3) camouflage patterns for both thermal and visible wavelength regions.

The problem is that emissivity is a microscopic property of surfaces that can be controlled by painting but it is difficult to imagine an approach for controlling it in fractions of a second. Those skilled in the art know that a thermal imager responds to the area weighted average emissivity averaged over the detector footprint. For a target at tactical ranges, that footprint has spatial dimensions that are typically between 10 and 100 cm on a side depending on detector size, focal length and target range. The detector footprint is the area on the target seen by a single detector. (For a distant target at range R viewed with a sensor with focal length f the dimension of the footprint $D_{ft}$ is related the detector dimension $D_{det}$, defined as the square root of its area by $D_{ft}=(R/f)D_{det}$)

Accordingly, there is a need in the art to have variable emittance surfaces. The present invention addresses this need.

SUMMARY OF THE INVENTION

One object of the present invention is to provide variable emittance surfaces.

The present invention achieves this and other objectives by making a surface where the effective emissivity varies on a scale smaller than the resolution of a thermal imager viewing the surface. One embodiment utilizes many cylindrical surfaces with their axis parallel and their surfaces nearly in contact. Individual cylinders have the property that when rotated to zero degrees they show a surface with an emissivity of one and when rotated to 180 degrees display a surface with an emissivity of zero. At intermediate angles of rotation a sensor that could resolve individual cylinders would see alternate lines with high and low emittance but a sensor unable to resolve individual cylinders sees a surface with an emittance that depends on the angle the cylinders are rotated. Variable emittance surfaces are expected to be useful for controlling target signature and for making spectral reflectivity measurements using a hyper-spectral radiometer.

From the point of view of a thermal sensor, the variable emittance surfaces of the invention, enable an operator to choose the surface of an object from a continuum of treated surfaces with different spectral emittance and reflectance properties in fractions of a second. The implication is that if the area weighted average emissivity over an area, small compared to the detector footprint, is appropriately varied, then a thermal imaging sensor would have trouble distinguishing this small area from the background.

BRIEF DESCRIPTION OF THE DRAWINGS

These and other objects of the invention will become readily apparent in light of the Detailed Description Of The Invention and the attached drawings wherein.

DETAILED DESCRIPTION OF THE INVENTION

From the point of view of a thermal sensor, the variable emittance surfaces of the invention, enables an operator to choose the surface of an object from a continuum of treated surfaces with different spectral emittance and reflectance properties in fractions of a second. However, prior to describing the invention in detail, the theory of the invention must be described.

Theory

Suppose a plane target surface is normal to a sensor line of sight and half the detector footprint on a target falls entirely on a surface with emissivity $\epsilon_1$ and the other half falls on a surface with emissivity $\epsilon_2$. For this case the emittance seen by the detector is $\frac{1}{2}(\epsilon_1+\epsilon_2)$. More generally if the detector footprint has area A and area $A_i$ of the footprint is on a surface with emissivity $\epsilon_i$, then the effective emittance $\epsilon$ seen by the detector is given by $$\varepsilon = \frac{\sum_{i=1}^{n} A_i \varepsilon_i}{\sum_{i=1}^{n} A_i} \quad (1)$$

Here the sum in the denominator equals the area A of the detector footprint. Equation (1) asserts the effective emittance seen by a detector is the area weighted average emissivity over the detector footprint.

The designs of the invention for variable emissivity surfaces depend on the validity of Equation (1). To clarify the meaning of this equation and gain a deeper understanding of it, a derivation of this equation will now be provided.

In general, the emissivity of a surface depends on the wavelength, temperature and the angle at which the sensor looks at the surface.

$$\varepsilon_{\lambda,\theta}(\lambda, , T, \theta, \varphi) = \frac{L(\lambda, T, \theta, \varphi)}{L_{\lambda,b}(\lambda, T)} \quad (2)$$

Here the symbols $\lambda, T, \theta$ and $\phi$ in parenthesis denote wavelength, temperature, elevation and azimuthal angles, respectively, and indicate that this directional spectral emissivity depends on all these quantities. The angles $\theta$ and $\phi$ are measured from the surface normal of the emitting surface and point toward the center of the sensor entrance aperture. $L_\lambda(\lambda, T,\theta,\phi)$ is the actual emitted radiance from the surface between $\lambda$ and $\lambda+\Delta\lambda$ in the $\theta,\phi$ direction at wavelength $\lambda$ and temperature T while $L_{\lambda,b}(\lambda,T)$ is the blackbody radiance between $\lambda$ and $\lambda+\Delta\lambda$ that would be emitted if a blackbody replaced the actual surface element. A gray body is one for which $\epsilon_{\lambda,\theta}$ in (2) is independent of wavelength and temperature and depends only on $\theta$ and $\phi$. A diffuse emitting surface, sometimes called a lambertian surface, is a surface for which $\epsilon_{\lambda,\theta}$ in (2) is independent of direction.

The $\lambda$ and $\theta$ subscripts in $\epsilon_{\lambda,\theta}$ are needed to distinguish between several different emissivities.

$\epsilon_{\lambda,\theta}$ is termed directional spectral emissivity. Other emissivities are defined in terms of $\epsilon_{\lambda,\theta}$.

$\epsilon_\lambda$ is $\epsilon_{\lambda,\theta}$ averaged over a hemisphere. It is termed spectral emissivity or hemispherical spectral emissivity.

$\epsilon_\theta$ is $\epsilon_{\lambda,\theta}$ averaged over all wavelengths. It is termed directional emissivity.

$\epsilon_{\lambda1\to\lambda2,\theta}$ is $\epsilon_{\lambda,\theta}$ averaged between $\lambda_1$ and $\lambda_2$. It is termed directional band averaged emissivity.

$\epsilon_{\lambda1\to\lambda2}$ is $\epsilon_{\lambda1\to\lambda2,\theta}$ averaged over a hemisphere. It is termed band averaged hemispherical emissivity.

$\epsilon$ is $\epsilon_{\lambda,\theta}$ averaged over a hemisphere and averaged over all wavelengths. It is referred to as hemispherical total emissivity.

Notation for the different emissivities is introduced because all the quantities denoted by these symbols can be controlled in fractions of a second by the invention.

Suppose the detector footprint falls on a surface where area $dA_1$ of the surface has emissivity $\epsilon_{\lambda,\theta,1}(\lambda,T,\theta,\phi)$ and the other part of the footprint falls on a surface with area $dA_2$ and emissivity $\epsilon_{\lambda,\theta,2}(\lambda,T,\theta,\phi)$. It is assumed the angles $\theta$ and $\phi$ change negligibly between area $dA_1$ and $dA_2$ and for the moment this change is neglected. Let $\phi_1$ and $\phi_2$ denote the flux incident on the detector from areas $dA_1$ and $dA_2$. Then, $$\phi_1 = L_{\lambda,1}(\lambda, T, \theta, \varphi)dA_1\cos\theta d\omega \quad (3)$$
$$= \varepsilon_{\lambda,\theta,1}(\lambda, T, \theta, \varphi)dA_1 L_{\lambda,b}(\lambda, T)\cos\theta d\omega$$

and a similar expression could be written for $\phi_2$ where $dA_1$ and $dA_2$ are at the same temperature T. In equation (3) $d\omega$ is the solid angle subtended at the location of $dA_1$ by the sensor entrance pupil. The factor $\cos\theta$ appears in (3) because radiance is defined in terms of projected area and $dA_1$ is the actual area characterized by $\epsilon_{\lambda,\theta,1}$. The total flux $\phi$ on a detector is the sum of the flux from areas $dA_1$ and $dA_2$:

$$\phi = (\varepsilon_{\lambda,\theta,1}(\lambda, T, \theta, \varphi)dA_1 + \varepsilon_{\lambda,\theta,2}(\lambda, T, \theta, \varphi)dA_2)L_{\lambda,b}(\lambda, T)\cos\theta d\omega \quad (4a)$$

$$= \varepsilon_{\lambda,\theta}(\lambda, T, \theta, \varphi)(dA_1 + dA_2)L_{\lambda,b}(\lambda, T)\cos\theta d\omega \quad (4b)$$

Equation (4b) defines what is meant by the effective directional spectral emittance $\varepsilon_{\lambda,\theta}$ of a surface with area $dA_1+dA_2$ seen by a single detector when $dA_1$ has one emissivity and $dA_2$ has a different emissivity. Comparing (4a) and (4b):

$$\varepsilon_{\lambda,\theta}(\lambda, T, \theta, \varphi) = \frac{\varepsilon_{\lambda,\theta,1}(\lambda, T, \theta, \varphi)dA_1 + \varepsilon_{\lambda,\theta,2}(\lambda, T, \theta, \varphi)dA_2}{(dA_1 + dA_2)} \quad (5)$$

For a lambertian source emittance is independent of $\theta$ and $\phi$ and equation (5) becomes $$\varepsilon_\lambda(\lambda, T) = \frac{\varepsilon_{\lambda,1}(\lambda, T)dA_1 + \varepsilon_{\lambda,2}(\lambda, T)dA_2}{(dA_1 + dA_2)} \text{ for lambertian source} \quad (6)$$

Equations (5) and (6) have the same form as equation (1) for the case where the detector footprint encompasses an area characterized by two emissivities. Equation (5) indicates the way equation (1) should be generalized:

$$\varepsilon_{\lambda,\theta}(\lambda, T, \theta, \varphi) = \frac{\sum_{i=1}^{n} A_i \varepsilon_{\lambda,\theta,i}(\lambda, T, \theta, \varphi)}{\sum_{i=1}^{n} A_i} \quad (7)$$

The preceding discussion and equation (7) support the following observations:

The emissivities on the right hand side of equation (7) are directional spectral emissivities defined by equation (2). If equation (7) is integrated over a hemisphere and over all wavelengths then equation (1) is recovered. Thus (7) is a generalization of equation (1).

In deriving equation (7) it was assumed that because the areas $dA_1$ and $dA_2$ were small, the direction to the sensor was the same for both areas i.e. in deriving (7) it was assumed that $dA_1$ and $dA_2$ were in the same plane. In the plane approximation, the source areas in (7) can be either actual source areas or projected source areas seen by the sensor and the results will be the same. Had the assumption that $dA_1$ and $dA_2$ surface normals pointed in the same direction not been made, $dA_1$ and $dA_2$ in equation (5) would have been replaced by $dA_1 \cos\theta_1$ and $dA_2 \cos\theta_2 z$ and these are the projected areas of $dA_1$ and $dA_2$. These considerations show that $A_i$ in equations (1) and (7) are projected areas.

If the constituent emissivities $\varepsilon_{\lambda,\theta,i}$ are lambertian (independent of viewing direction) then the effective spectral emittance $\varepsilon_\lambda$ is independent of viewing direction.

By using one source with an $\varepsilon_{\lambda,\theta,1}$ of zero independent of wavelength, a second source then with an $\varepsilon_{\lambda,\theta2}$ of one also independent of wavelength then by controlling the relative areas of sources one and two the effective gray body directional emissivity $\varepsilon_\theta$ of a surface continuously morphs between $\varepsilon_{\lambda,\theta,1}$ and $\varepsilon_{\lambda,\theta,2}$.

By using sources $\varepsilon_{\lambda,\theta,1}$ and $\varepsilon_{\lambda,\theta,2}$ which depend on wavelength and direction, the effective spectral directional emissivity $\varepsilon_{\lambda,\theta}$ continually morphs between $\varepsilon_{\lambda,\theta,1}$ and $\varepsilon_{\lambda,\theta,2}$ as the relative areas $A_1$ and $A_2$ change.

Equation (7) and its derivation is based on approximating a surface by a series of plane surface where each plane surface has an emissivity $\varepsilon_i$. A more precise expression for effective directional emittance relaxes the plane surface approximation but requires an integral:

$$\varepsilon_{\lambda,\theta}(\lambda, T, \theta, \varphi) = \frac{\iint \varepsilon_{\lambda,\theta}(\lambda, T, \theta, \varphi, A)dA_p}{\iint dA_p} \quad (8)$$

In this equation $dA_p$ is the projected area seen by the sensor and equals $\cos\theta_A dA$ where $dA$ is the actual area and the angle $\theta_A$ is the angle between the normal to $dA$ and a line from $dA$ to the center of the sensor entrance pupil. The positional dependence of $\varepsilon_{\lambda,\theta}$ is indicated by $A$ in its argument. The integral is over the detector footprint.

The analysis of variable emittance surfaces done here neglects reflections. Reflections of high emissive surfaces seen by the sensor as reflections in low emissive surfaces should be considered in an improved treatment of the subject.

Given this theory then, variable emittance surfaces utilizing cylindrical, spherical and plane elements are described.

Various Embodiments

Cylindrical Elements

Figure 1:
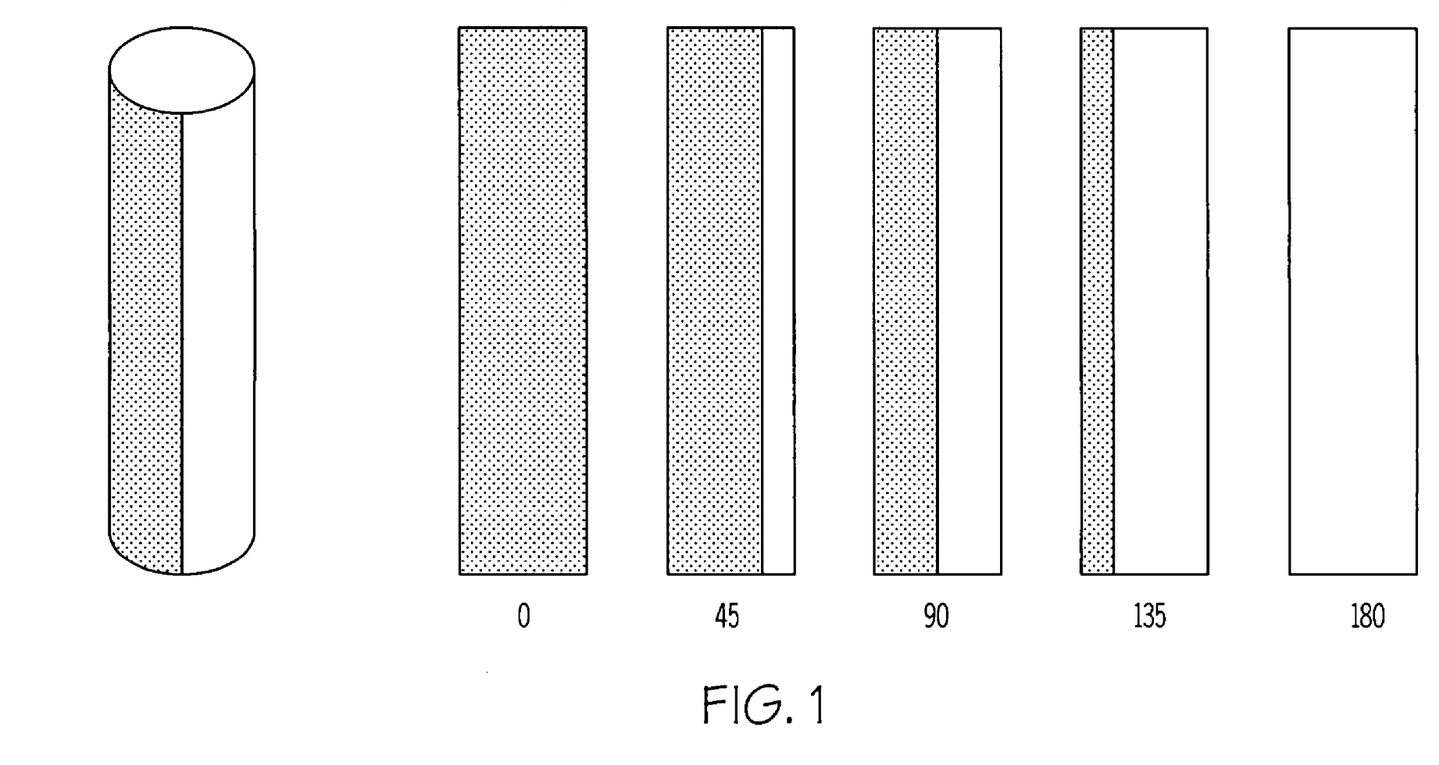
FIG. 1 illustrates an individual cylinder rotated at 0, 45, 90, 135 and 180 degrees.

Circular Cross Section. Imagine a cylindrical surface with circular cross section where one side of the cylinder is treated so that it has an emissivity near one and the other side of the cylindrical surface is treated so that it has an emissivity near zero. Suppose also that both sides of the cylinder act as lambertian sources. FIG. 1 illustrates an individual cylinder rotated at 0, 45, 90, 135 and 180 degrees.

In FIG. 1, the left part of the figure shows an isometric view of a cylinder with a circular cross section while the right part shows a side view of a single cylinder with a circular cross section rotated to different positions. One side of the cylinder has an emissivity of one indicated by black and the other side of the cylinder has an emissivity of zero indicated by white.

Also in FIG. 1, at an angle of zero degrees, the cylinder surface pointing toward the sensor has an emissivity of one and at 180 degrees the cylinder surface pointing toward the sensor has an emissivity of zero. At intermediate angles, when the cylinder is poorly resolved, its effective emissivity is gray and varies continuously with rotation angle between one and zero. If the cylinder surface denoted by black had a high spectral emissivity $\varepsilon_{\lambda,1}$ and the cylinder surface denoted by white had a low spectral emissivity $\varepsilon_{\lambda,2}$, then by rotating the cylinder, the spectral emissivity $\varepsilon_\lambda$ would vary continuously between the two extremes as the cylinder was rotated. If the cylinder surface denoted by black had one directional emissivity $\varepsilon_{\theta,1}$ and the cylinder surface denoted by white had a different directional emissivity $\varepsilon_{\theta,2}$, then as the cylinder rotated the directional properties of the emissivity $\varepsilon_\theta$ would vary continuously between the two extremes.

Figure 2:
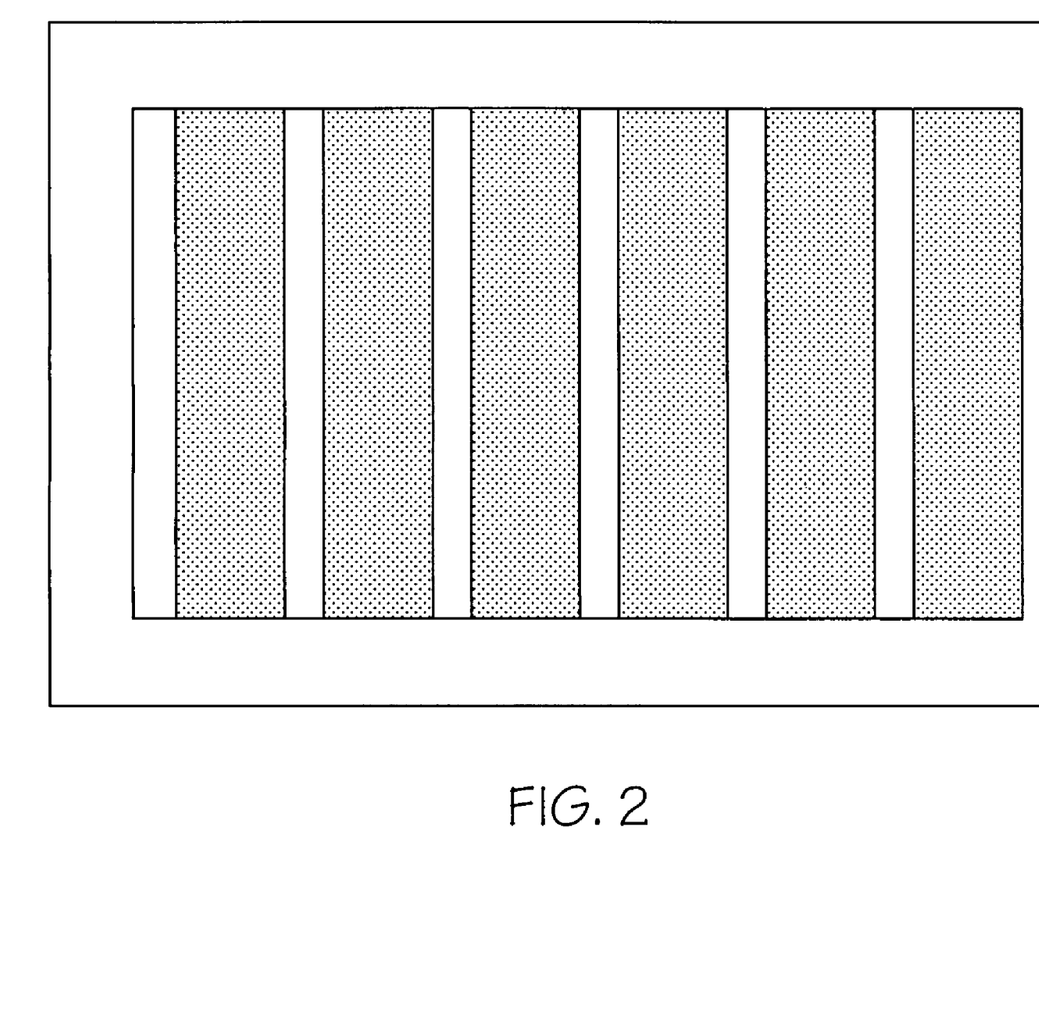
FIG. 2 illustrates a variable emittance surface made using circular cross section cylinders such as that illustrated in FIG. 1.

FIG. 2 illustrates a variable emittance surface made using circular cross section cylinders. The cylinders of FIG. 2 are put side by side to cover as much area as desired and a mechanism, under the control of an operator, rotates all the cylinders to some angle. A 45 degree angle is illustrated in the figure. A sensor viewing this surface with spatial resolution much greater than the diameter of a cylinder sees a surface with an emittance of about 0.75. By suitably changing the angle of rotation of the cylinders the effective emittance can be made to either increase or decrease. Referring to the surface treatments described in the caption to FIG. 1, depending on how each half of the cylinder surface is treated, the gray body emittance, the spectral emittance or the directional properties of the emittance can be controlled by changing the rotation angle of individual cylinders.

Triangular Cross Section

Figure 3:
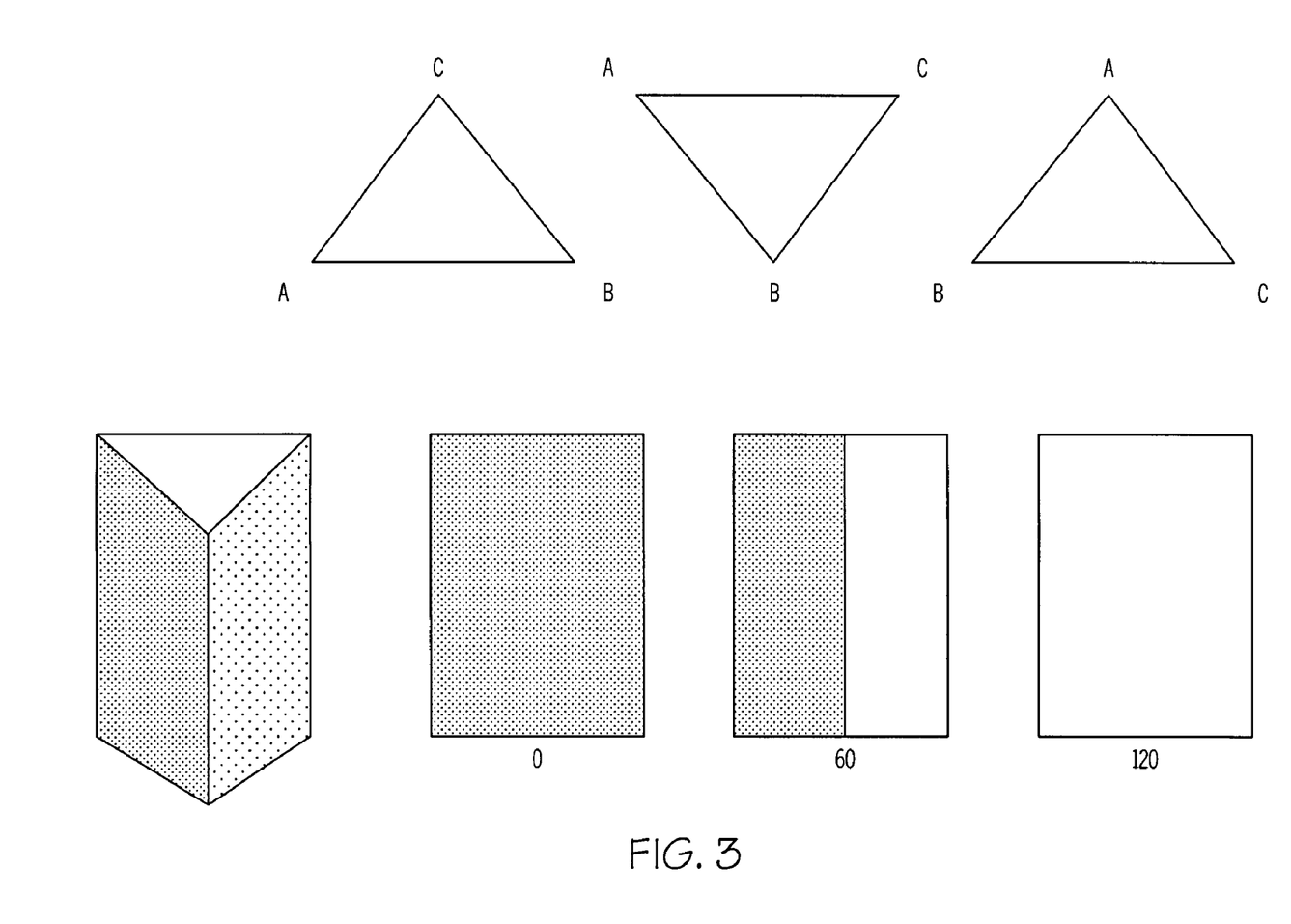
FIG. 3 shows an isometric view of a triangular prism with side and top views of a single triangular prism rotated to different positions.

In FIG. 3, the left and right parts of the figure show an isometric view of a triangular prism along with side and top views of a single triangular prism rotated to different positions. Sides AB, BC and CA of the prism have emissivities $\epsilon$ of one, one-half and zero respectively and are represented in the figure by black and gray respectively. Numbers in the figure refer to the angle of rotation.

Referring to FIG. 3, The emittance of these surfaces to a sensor not able to resolve the individual triangular facets is one at zero degrees, is 0.75 at sixty degrees and one-half at 120 degrees and changes continuously with rotation angle. As the cylinder is rotated further to 240 degrees only surface CA is visible and the effective emittance of the surface changes to zero. Had the surfaces AB, BC and CA been treated to have spectral emissivities $\epsilon_{\lambda,1}$, $\epsilon_{\lambda,2}$, and $\epsilon_{\lambda,3}$ then by rotating the cylinder the effective spectral emittance of a surface made up of multiple cylinders, as in FIG. 2, could be controlled by appropriately rotating the cylinders. Had the surface AB, BC and CA been treated to have specific directional emissivities $\epsilon_{\theta,1}$, $\epsilon_{\theta,2}$, $\epsilon_{\theta,3}$ then the effective directional emittance $\epsilon_\theta$ of a surface made up of multiple cylinders could be controlled by appropriately rotating the cylinders.

Spherical Elements

Figure 4:
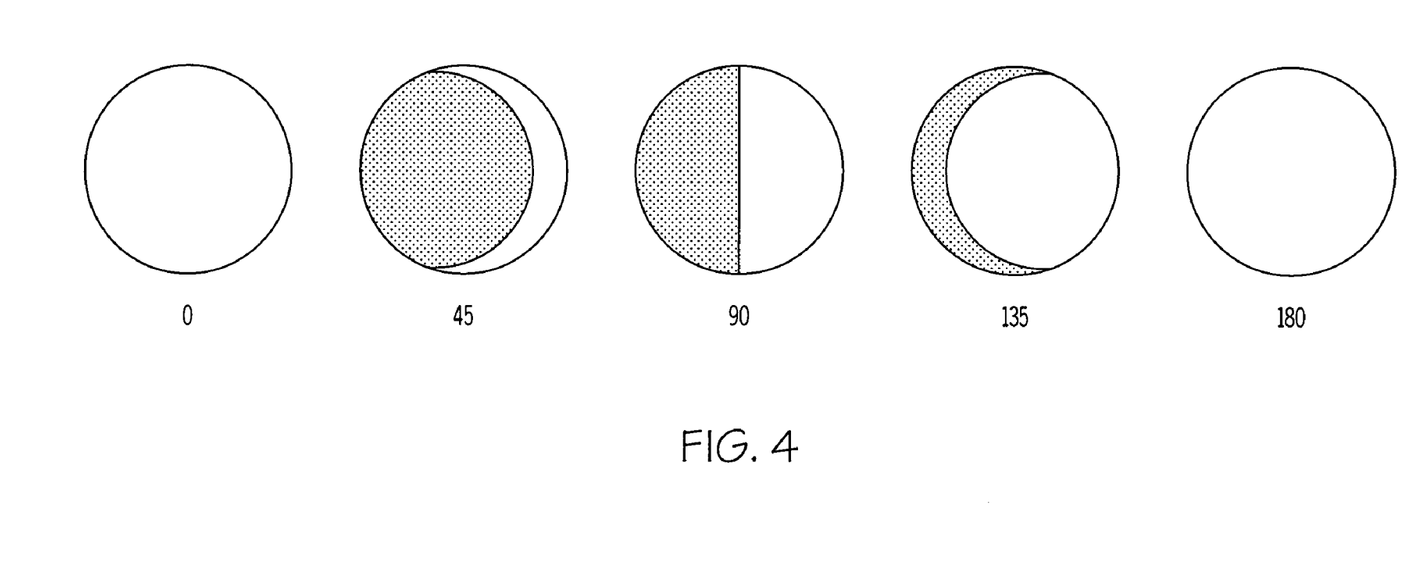
FIG. 4 shows views of a sphere wherein one half of the sphere (a hemisphere) has an emissivity of one, indicated by black while the other half of the sphere has an emissivity of zero, indicated by white.

FIG. 4 shows views of a sphere, wherein one half of the sphere (a hemisphere) has an emissivity of one, indicated by black while the other half of the sphere has an emissivity of zero, indicated by white.

Referring to FIG. 4, the sphere is rotated about a vertical axis through its center. At an angle of zero degrees only that part of the sphere with an emissivity of one is visible to the sensor and at 180 degrees only that part of the sphere with an emissivity of zero is visible to the sensor. At intermediate angles, when the sensor is unable to resolve the high and low emissivity parts of the sphere its effective directional gray body emittance varies continuously with rotation angle between one and zero. Had the areas denoted by black and white in the figure been treated to produce surfaces with spectral emissivity $\epsilon_{\lambda,1}$ and $\epsilon_{\lambda,2}$ then the effective spectral emittance $\epsilon_\lambda$ of a surface covered with two layers of spheres can be continuously varied between these extremes. Similarly, had the areas denoted by black and white in the figure been treated to produce surfaces with directional emissivities $\epsilon_{\theta,1}$ and $\epsilon_{\theta,2}$ then the effective directional emittance $\epsilon_\theta$ of a surface covered with two layers of spheres can be continuously varied between these extremes.

Figure 5:
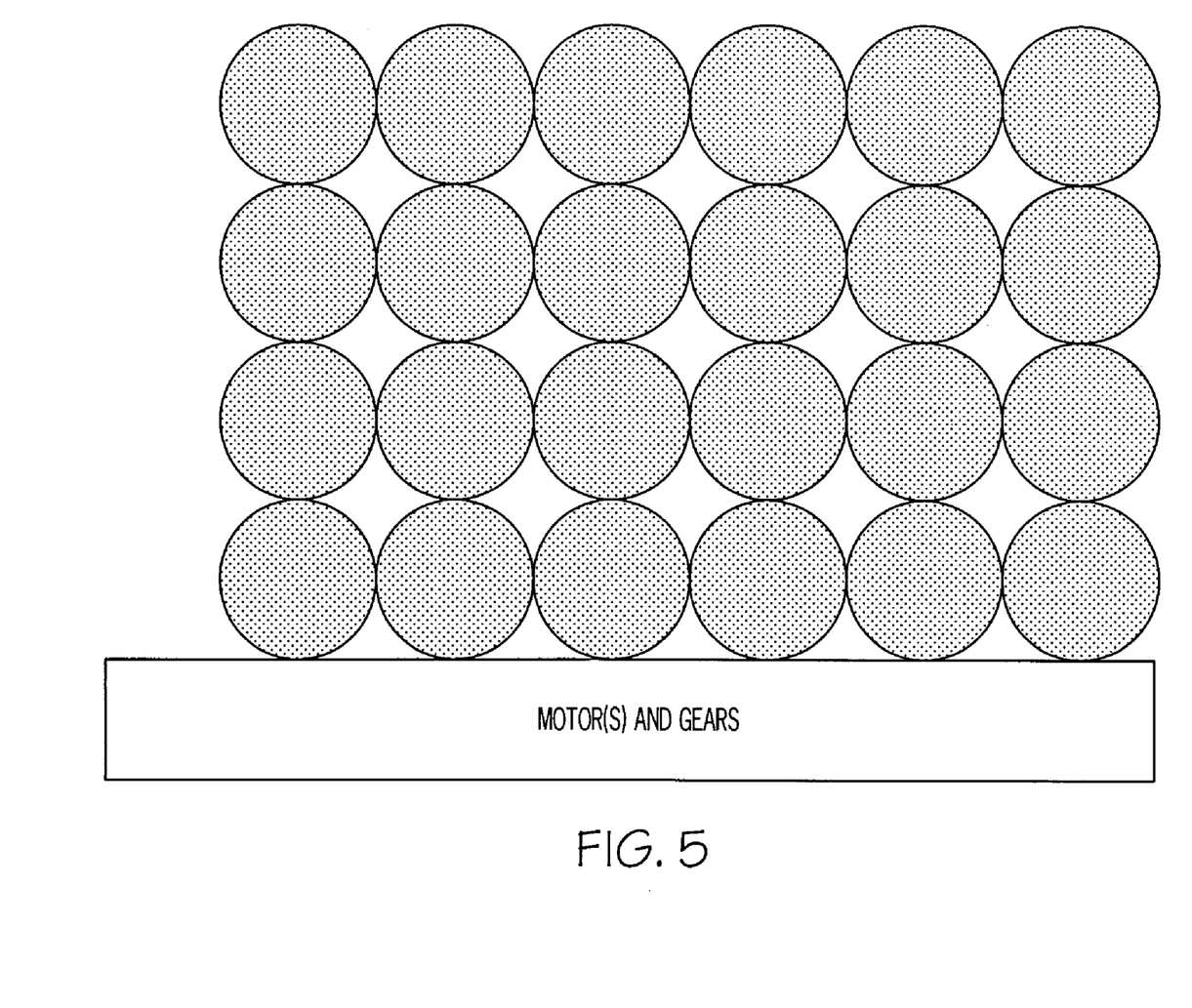
FIG. 5 shows a variable emittance surface made up of spheres, such as that illustrated in FIG. 4, all rotated to zero degrees.

FIG. 5 shows a variable emittance surface made up of spheres all rotated to zero degrees.

FIG. 5 illustrates that because one layer of spheres does not completely cover a surface, a single layer of spheres is incapable of varying the effective directional spectral emittance $\epsilon_{\lambda,\theta}$ between zero and one. However if the surface is covered with two layers of spheres with the second layer filling in the gaps formed by the first layer, then the effective directional spectral emittance $\epsilon_{\lambda,\theta}$ can be varied between near zero and one.

Figure 6:
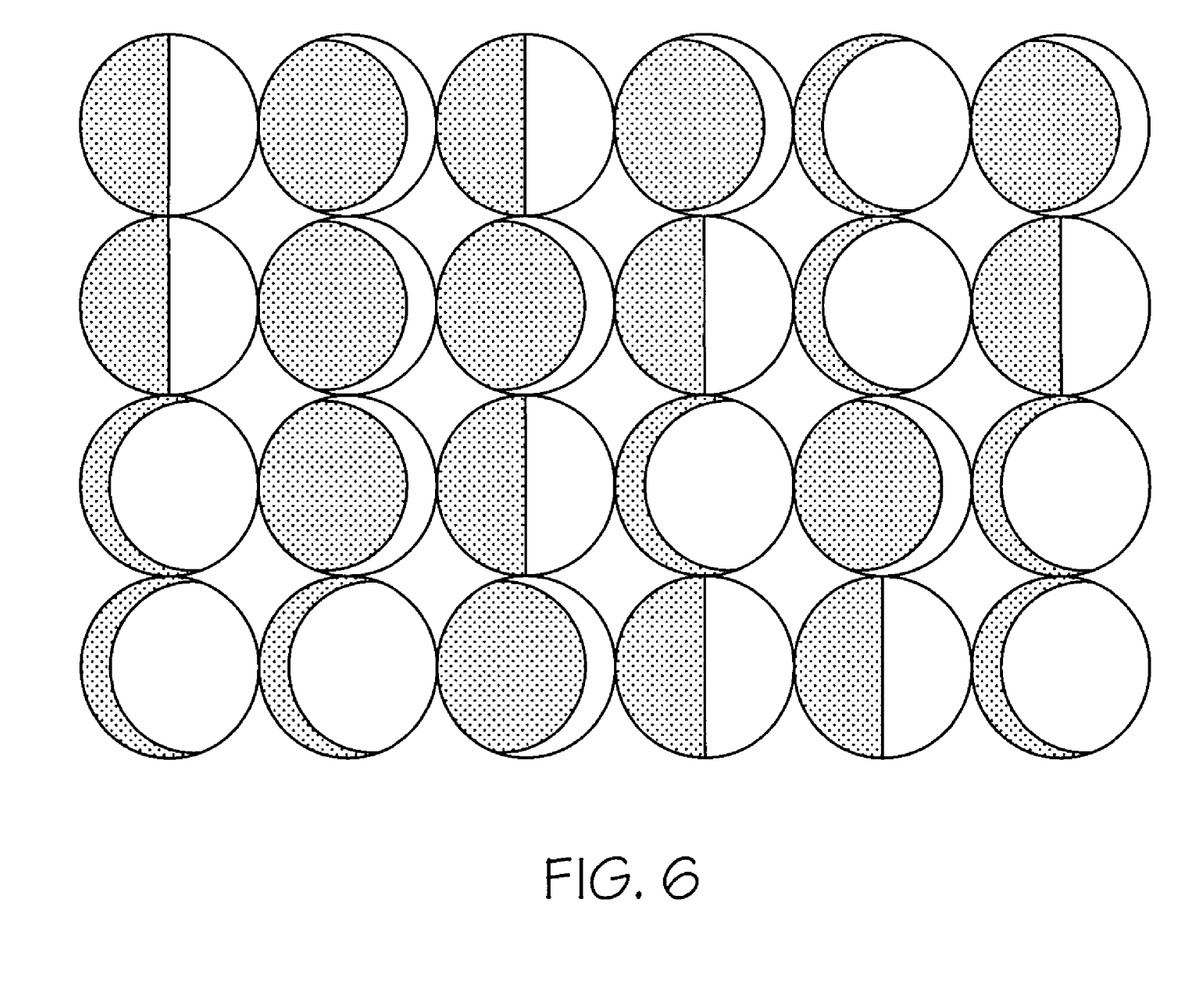
FIG. 6 shows a variable emittance surface made up of a single layer of 24 spheres.

FIG. 6 shows a variable emittance surface made up of a single layer of 24 spheres.

In FIG. 6, eight of the spheres are rotated to 90 degrees, eight of the spheres are rotated to 45 degrees and eight of the spheres are rotated to 135 degrees. Assuming black corresponds to an emissivity of one and white corresponds to an emissivity of zero, the effective emittance of the area contributed by the spheres, for a sensor unable to resolve the spheres, is about one-half. Because the surface is not entirely covered with spheres, the effective surface emittance is different from this and depends on the emissivity of the material behind the spheres.

Plane Elements

Figure 7:
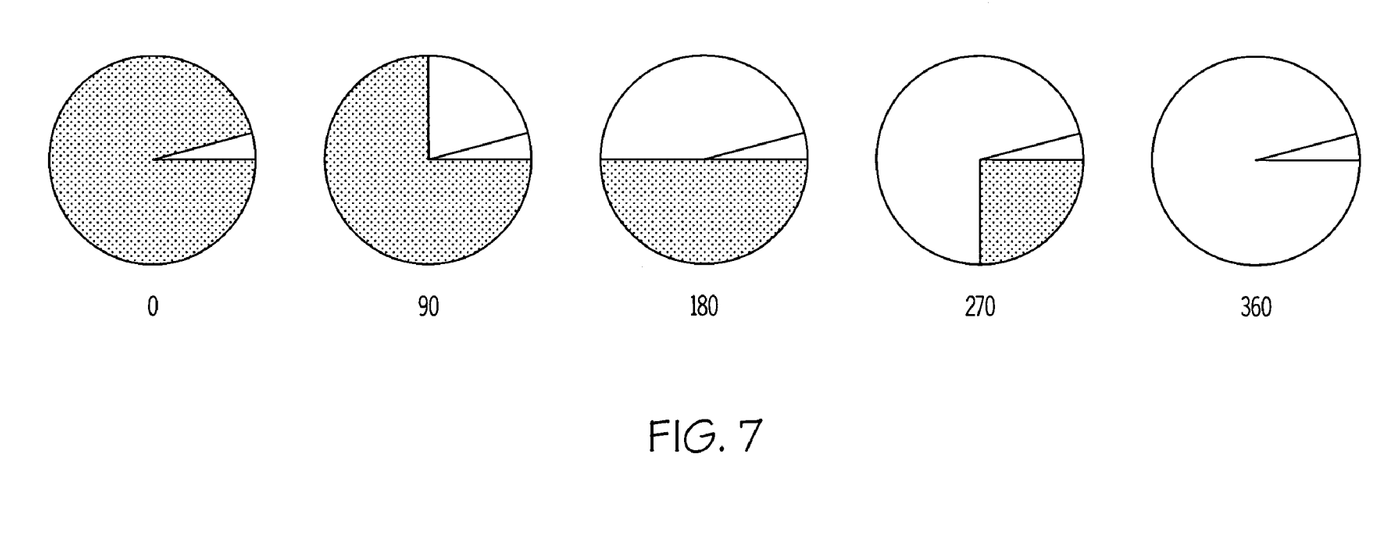
FIG. 7 illustrates an element of a plane variable emittance surface.

FIG. 7 illustrates an element of a variable emittance surface of plane geometry. Behind one sector, colored gray and with an emissivity $\epsilon$ of one-half are fan blades colored white to denote an emissivity $\epsilon$ of zero. The area colored black, visible when the fan blades are collapsed, denotes an emissivity $\epsilon$ of one.

In FIG. 7, as the fan blades are successively pulled out so they cover an area of 90, 180, 270 and 360 degrees, the effective gray body emissivity $\epsilon$ of the area goes from nearly one at zero degrees to nearly zero at 360 degrees. How close $\epsilon$ comes to zero and one depends on the area of the gray colored sector that houses the fan blades. Had the areas depicted in black and white been characterized by different spectral emissivities $\epsilon_{\lambda,1}$ and $\epsilon_{\lambda,2}$ then as more of the fan blades are exposed the effective directional spectral emissivity $\epsilon_\lambda$ would morph between $\epsilon_{\lambda,1}$ and $\epsilon_{\lambda,2}$. Had the areas depicted in black and white been characterized with directional spectral emissivities $\epsilon_{\lambda,\theta,1}$ and $\epsilon_{\lambda,\theta,2}$, then by spreading out the fan blades, the effective directional spectral emissivity $\epsilon_{\lambda,\theta}$ could be controlled between $\epsilon_{\lambda,\theta,1}$ and $\epsilon_{\lambda,\theta,2}$.

FIG. 7 describes how using a set of fan blades, the effective surface emittance $\epsilon_{\lambda,\theta}$ can be made to vary over a circular area. By changing the geometry of the fan blades, the same principle can be used to vary the effective emittance over a square or rectangular region.

Comparison of Variable Emittance Embodiments

One use of variable emittance surfaces is for measuring spectral emittance of tank surfaces. Since tank surfaces are approximately lambertian, a desired property of the variable emittance surface is that it be lambertian. Another desired attribute of the variable emittance surface is that a single layer completely cover the surface since this allows the greatest control of surface properties. A third attribute is the linearity of the relationship between emittance and element rotation angle. A linear relationship is desired for ease in calibrating the surface.

Circular Cross Section Cylindrical Surface Design of FIG. 2

Lambertian Properties.

When the sensor moves in a plane perpendicular to the cylinder axis then the radiance seen by the sensor changes with viewing angle because of changes in the relative amount of surfaces $A_1$ and $A_2$ that are visible. However, the cylinders can be arranged so that increases in surface area $A_1$ caused by movement in this plane on one cylinder is counterbalanced with decreases in $A_1$ in an adjacent cylinder. Similar remarks apply to $A_2$. With a modification of the design shown in FIG. 2, this geometry allows for a nearly lambertian surface in a plane perpendicular to the cylinder axis. When the sensor moves in a plane that contains the cylinder axis, lambertian properties of the variable emittance surface depend mainly on cylinder surface treatment.

Surface Coverage.

This geometry completely covers the surface and allows maximum control of surface properties.

Linearity.

The relationship between apparent emittance and rotation angle is approximately linear.

Triangular Prism Design of FIG. 3

Lambertian Properties.

Comments for lambertian properties made in reference to FIG. 2 apply here.

Surface Coverage.

This geometry completely covers the surface at multiples of 60 degrees. At other angles small gaps appears between the cylinders and allow the surface behind the cylinders to be seen. Linearity. The relationship between apparent emittance with rotation angle is non-linear.

Versatility.

Because this design utilizes three rather than two surfaces, it is more versatile then competing designs in controlling surface properties.

Spherical Surface Design of FIG. 6

Lambertian Properties.

When the sensor moves in a plane perpendicular to the axis of the rotation, the system can be balanced so that additional white space seen in some spheres is balanced by additional black space seen in other spheres and in this plane the surface is approximately lambertian. If the spheres are rotated to ninety degrees as in FIG. 4, individual spheres will approximately make a lambertian surface.

Surface Coverage.

As indicated in FIG. 5, a single layer of spheres provides incomplete coverage. This can be compensated for by using two layers of spheres.

Linearity.

The relationship between apparent emissivity with rotation angle is approximately linear.

Planar Surface Design of FIG. 7

Lambertian Properties. The lambertian properties of the surface depend on the surface treatment. This geometry is the same as a flat tank surface and for this reason the properties of this surface may be particularly well matched to a flat tank surface.

Surface Coverage. The geometry shown in this figure has incomplete coverage. However by modifying this geometry to a rectangular or square shape, coverage can be increased.

Linearity. The relationship between apparent emissivity with rotation angle is approximately linear.

Spectral Emittance Measurements

The problem addressed is to measure the spectral emittance of a tank sized object in the field. Spectral ranges of interest are 3-5 and 8-12μ. Typically, target surfaces to be measured are diffuse, rather than spectral reflectors and for reflection angles not too far from the normal are well approximated by lambertian sources. The main interest is in area averaged spectral emissivity. Stated another way, there is little interest in how the spectral emittance varies from one small part of the target to another small part of the target. Two hyperspectral imaging devices are available: one operates in the 3-5μ band and the other operates in the 8-12μ band. Blackbody sources with an adjustable temperature are also available. Although more accurate measurements are welcome, errors of 10% are acceptable.

Invention

Overview of Measurement.

The idea of the measurement is to place a variable emittance source on the target area to be measured so that the sensor simultaneously sees the target surface and the variable emittance source. The variable emittance source is adjusted so that the signal seen by the sensor from the target surface matches the signal from the variable emittance source. (The sensor sees emitted and reflected radiation from the target and variable emissivity surfaces. It also sees radiation emitted from the atmosphere and for low transmission, atmospheric radiation is the dominant radiation seen by the sensor.) If the target surface and the variable emittance surface temperature are the same and if they both reflect incident radiation into the sensor the same way then when the signal strength seen by the sensor when it views the target surface matches the signal strength when the sensor views the variable emittance surface it can be concluded that the emittance of the target and the variable emittance surfaces are the same. The spectral emittance properties of the variable emittance surface are known either by modeling or by laboratory measurement. If the sensor is a broadband sensor, this procedure measures broadband emittance. If the sensor is a hyperspectral imaging device and the signal strength is matched for each sub-band then this procedure measures the directional spectral emittance.

Field-of-View, Range and Size of Variable Emittance Surface.

Interest is in the spectral emittance over a substantial part of the tank sized target and transmission considerations dictate that a wide field-of-view optic on each hyperspectral sensor be used. The range is adjusted so that individual elements of the variable emittance surface are not resolved. The size of the variable emittance surface should be large enough so that it occupies at least sixteen picture elements in the imager.

Spectral Transmission Measurement.

Having chosen the range, an accuracy analysis of the results requires spectral transmission measurements. For wavelengths where the transmission is low, atmospheric radiation dominates the signal seen by the sensor and then spectral emittance measurements will either be inaccurate or not possible depending on the wavelength and transmission value. Thus, it is important to measure atmospheric spectral transmission and this is done in the following way.

At close range have both hyperspectral imagers view the blackbody and record the spectra.

A spectrum is taken of the blackbody by the 8-12 μ hyperspectral imager at range while the 3-5 μ hyperspectral imager confirms that the close up spectrum has not changed.

A spectrum is taken of the blackbody by the 3-5 μ hyperspectral imager at range while the 8-12 μ hyperspectral imager confirms that the close up spectrum has not changed.

The spectral transmission in both bands is obtained by taking the ratio of the at range spectrum to the close up spectrum.

In making these measurements, the blackbody must be substantially larger than the detector footprint when the sensor is at range. To reduce the deleterious effects of low transmission it is desirable to make the measurements at the closest practical range and this was one consideration in using a wild field-of-view optic.

Reflected Radiation and the Choice of Variable Emittance Surface.

Reflected radiation will be important whenever it is non-negligible compared to the emitted radiation. For the purpose of making spectral emittance measurements use a two pronged approach:

Minimize sources of reflected radiation and

If there is reflected radiation ensure that radiation is reflected into the sensor equally by the target and variable emittance reference surfaces.

To minimize reflected radiation the measurements will be done in the evening and when possible under a clear sky. To insure that reflected radiation is reflected into the sensor equally by the target and variable emittance reference surfaces, place a large hot blackbody source and or large electric blanket at several locations where reflected radiation is expected to originate from. The idea is to have the blackbody source be so hot and the electric blanket be so large that although the target surface is negligibly heated by these sources, reflected radiation from the target is large compared to emitted radiation. If this is not possible with hot sources, then this indicates that reflected radiation from the background is not significant and the choice of variable emittance surface is not dictated by these considerations. However, if a reflected signal can be obtained, adjust the variable emittance surfaces so that the signal seen by the imager in the variable emittance surface matches the signal from the target surface and chose a variable emittance surface from the proposed designs so that this match is maintained for each of the several locations of the source (blackbody/electric blanket) without adjusting the variable emittance surface. Ideally the signal from the variable emittance surface matches the target signal for all wavelengths of interest. For wavelengths where reflections are important, accurate measurements require this condition be satisfied and the use of a different reference source is needed for those wavelengths where this condition is not satisfied. For wavelengths where this condition is satisfied the variable emittance surface has the property that it approximately reflects background radiation the same way the target reflects background radiation.

Matching Variable Emittance and Target Surface Temperatures.

One can either measure the target at ambient temperature or at an elevated temperature. For both approaches the variable emittance surface is in intimate thermal contact with the surface to be measured.

Ambient Temperature Approach.

Do not exercise the tank and have several large fans blowing on the tank and variable emittance surface. The measurements are made when thermocouples attached to both surfaces indicate that both surfaces are at the same temperature to within 0.1 C. The measurements are done at several values of the variable emittance surface to match the reference and target signals at the wavelengths of interest.

Elevated Temperature Approach.

Although the tank has been recently exercised, thermocouples on the tank area to be measured indicate that the surface temperature over the region of interest is constant to within 0.1 C. When necessary, several fans blow on the tank to reduce the time for this to happen. Electric heating elements are installed in the variable emittance surface and adjusted so that the temperature of the variable emittance surface matches that of the tank surface to within 0.1 C. When this condition is satisfied, measurements are done at several values of the variable emittance surface to match reference and target signals at the wavelengths of interest.

Several embodiments for making variable emissivity surfaces have been presented and the attributes of the different designs discussed. The proposed embodiments are capable of varying emittance in fractions of a second. The embodiments can also continuously control reflectance properties of a surface to being near perfectly diffuse to being near perfectly specular in fractions of a second. They can be used to locally control the color of a tank. In the proposed embodiments, only a small amount of energy is needed to move elements. For example, as shown in FIG. 5 a motor, or motors, coupled to gears and a shaft through the various 3 dimensional surfaces could be used to move the various surfaces as desired. Of course, those skilled in the art could engineer any number of ways to move the surfaces in accordance with the teachings of the invention. Of course, once moved, maintaining a particular color, reflective property or emittance requires no additional energy. While various embodiments have been described, those skilled in the art also could devise any number of various designs for the variable emittance surfaces of the present invention.

In conclusion, the variable emittance surfaces can be used to control vehicle surface characteristics in the visible and infrared. For example, in FIG. 3, different patterns can be painted on surfaces AB, BC and AC. By utilizing a surface made of many triangular prisms, a tank operator could chose from three patterns to have a more optimum match to a changing background.

What is claimed is:

1. A variable emittance surface whose emissivity can be varied continuously between one and zero by a user comprising:

a plurality of cylinders disposed in a plane with their axes parallel and their surfaces nearly in contact, the cylinders being rotatable about their axes, the cylinders having the property that when all of the cylinders are rotated to zero degrees they show a resultant surface having an emittance of one, when all of the cylinders are rotated to 180 degrees they display a resultant surface having an emittance of zero, and at intermediate angles of rotation, a sensor viewing the cylinders but unable to resolve individual cylinders would see a resultant surface having an emittance that varies continuously between one and zero as the cylinders are rotated.

2. A variable emittance surface whose emissivity can be varied continuously between one and zero by a user comprising:

a first plurality of spheres disposed in a first plane and a second plurality of spheres disposed in a second plane parallel to the first plane, with the surfaces of the spheres nearly in contact and the second plurality of spheres filling in gaps formed by the first plurality of spheres when viewed by a sensor whose line of sight is approximately perpendicular to the two planes and which is in front of the two planes, the spheres being capable of rotation about axes lying in their respective planes and passing through the centers of the spheres, individual spheres having the property that when all of the spheres are rotated to zero degrees they show a resultant surface having an emittance of one to the sensor, when all of the spheres are rotated to 180 degrees they display a resultant surface having an emittance of zero to the sensor, and at intermediate angles of rotation, a sensor lying in front of the two planes whose line of sight is approximately perpendicular to the two planes and which is unable to resolve individual spheres would see a resultant surface having an emittance that varies continuously between one and zero as the spheres are rotated.

* * * * *